US009986516B2

(12) United States Patent
Lagnado

(10) Patent No.: US 9,986,516 B2
(45) Date of Patent: May 29, 2018

(54) ADJUSTING TRANSMITTED POWER OUTPUT OF AN ANTENNA OF A DEVICE

(71) Applicant: HEWLETT-PACKARD DEVELOPMENT COMPANY, L.P., Houston, TX (US)

(72) Inventor: Isaac Lagnado, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 14/893,949

(22) PCT Filed: Aug. 30, 2013

(86) PCT No.: PCT/US2013/057643
§ 371 (c)(1),
(2) Date: Nov. 25, 2015

(87) PCT Pub. No.: WO2015/030810
PCT Pub. Date: Mar. 5, 2015

(65) Prior Publication Data
US 2016/0165551 A1 Jun. 9, 2016

(51) Int. Cl.
H04W 24/00 (2009.01)
H04W 52/28 (2009.01)
H04L 12/26 (2006.01)

(52) U.S. Cl.
CPC ........... H04W 52/283 (2013.01); H04L 43/10 (2013.01)

(58) Field of Classification Search
CPC ... H04W 52/283; H04W 52/28; H04W 24/00; H04L 43/10; H04L 12/26
See application file for complete search history.

(56) References Cited

U.S. PATENT DOCUMENTS

| 8,326,385 | B2 | 12/2012 | Brogle et al. | |
|---|---|---|---|---|
| 2008/0051165 | A1 | 2/2008 | Burgan et al. | |
| 2011/0050256 | A1* | 3/2011 | Frangen | G01D 5/2405 324/681 |
| 2011/0250928 | A1* | 10/2011 | Schlub | H01Q 1/243 455/550.1 |
| 2011/0309945 | A1 | 12/2011 | Hyde | |
| 2012/0050180 | A1* | 3/2012 | King | G06F 3/0416 345/173 |
| 2012/0142291 | A1 | 6/2012 | Rath | |
| 2012/0214412 | A1 | 8/2012 | Schlub et al. | |
| 2012/0214422 | A1 | 8/2012 | Shi | |
| 2012/0258772 | A1* | 10/2012 | Brogle | G01D 5/2405 455/556.1 |
| 2013/0253612 | A1* | 9/2013 | Chow | A61N 1/3787 607/60 |
| 2013/0257658 | A1* | 10/2013 | Hall | G01S 5/02 342/451 |

(Continued)

OTHER PUBLICATIONS

Lai, W et al, "Numerical modeling of electromagnetic coupling electronic device with proximity-based radio power control for LTE/WWANSAR", 2012.

*Primary Examiner* — Andrew Lee
(74) *Attorney, Agent, or Firm* — HPI Patent Department

(57) ABSTRACT

An antenna and a proximity sensor coupled to the antenna can determine proximity of an object to a device. The device can include a controller to adjust a transmitted power output of the antenna if the object is proximate to the device and measurements from the sensor collected over a period of time vary.

15 Claims, 5 Drawing Sheets

(56) References Cited

U.S. PATENT DOCUMENTS

| | | | |
|---|---|---|---|
| 2014/0302886 A1* | 10/2014 | Yun | H04B 1/3838 455/522 |
| 2016/0061983 A1* | 3/2016 | Heikura | H01Q 1/243 324/207.15 |
| 2016/0065260 A1* | 3/2016 | Heikura | H04B 1/3838 455/575.5 |
| 2016/0191121 A1* | 6/2016 | Bell | H04B 5/0037 307/104 |
| 2016/0255604 A1* | 9/2016 | Venkatraman | H04W 24/08 455/456.1 |

* cited by examiner

ADJUSTING TRANSMITTED POWER OUTPUT OF AN ANTENNA OF A DEVICE

BACKGROUND

Wireless capable consumer devices may communicate with other wireless capable devices by exchanging radio frequency (RF) communication signals via an antenna, which may be located internally or externally to the device. Transmitted power output of an antenna may directly impact wireless performance, with higher transmitted power output limits allowing the wireless device to achieve greater throughput and/or broader wireless coverage (e.g., enhanced coverage areas). Government agencies regulate the RF radiation output of various wireless devices to limit the general public's exposure to RF radiation. Specifically, government agencies specify maximum Specific Absorption Rates (SAR) for various RF devices based on different factors. SAR is defined as the rate of RF energy absorption per unit mass at a point in an absorbing body.

DETAILED DESCRIPTION

Figure 1:
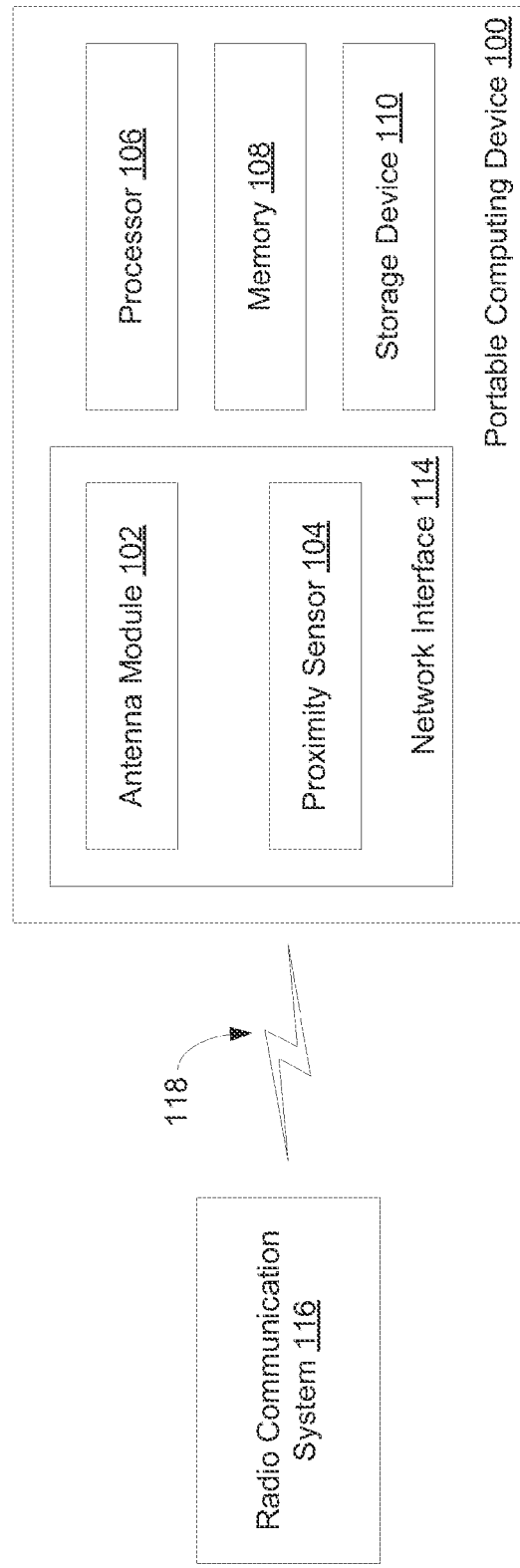
FIG. 1 is a block diagram illustrating a portable computing device adapted to communicate with a radio communication system, according to an example.

RF radiation exposure may be related to both transmitted power output of an antenna and separation distance (e.g., the distance separating the human body and the RF radiation source), as well as other factors (e.g., shielding, antenna design, etc.), Specifically, the amount of RF radiation absorbed by a human body may increase when the transmitted power output increases, as well as when the separation distance decreases. As an example, a strategy for satisfying SAR compliance criteria may be to reduce the transmitted power output of the antenna to offset a reduction in separation distance (e.g., reducing the transmitted power output as human body approaches RF radiation source). Other strategies to offset a reduction in separation distance include, but are not limited to, switching to another antenna of the wireless device, changing the data rate/modulation, and injecting idle times in the upload stream. As a result, it may be important for a wireless device to differentiate between human bodies and inanimate objects, such as books and tables, when adjusting the transmitted power output of an antenna of the device. For example, if the transmitted power output is reduced when the device is proximate an inanimate object (and not proximate an animate object), the output power may be unnecessarily reduced, negatively affecting the wireless performance of the device.

Examples disclosed herein provide the ability for a wireless device to differentiate between human bodies and inanimate objects. As an example, the wireless device may determine whether an object is animate or inanimate based upon whether movement is detected between the device and the object, as will be further described. With the ability to differentiate between animate and inanimate objects, the transmitted power output of an antenna of the wireless device may be reduced when the device detects that is proximate an animate object, but unaffected or increased when the device detects that is proximate an inanimate object. By differentiating between animate and inanimate objects, the wireless performance of the device may overall improve.

In one example, a method of adjusting a transmitted power output of an antenna of a device includes monitoring a measurement from a proximity sensor coupled to the antenna. The method includes determining whether the device is proximate to an object based upon the measurement and, upon determining the device is proximate to the object, collecting measurements from the proximity sensor over a period of time. The method includes adjusting the transmitted power output of the antenna if the measurements collected over the period of time vary.

In another example, a device can include an antenna and a proximity sensor coupled to the antenna to determine whether the device is proximate to an object if a measurement from the sensor is above a threshold value. The device can include a controller to reduce a transmitted power output of the antenna if the device is proximate to the object and measurements from the sensor collected over a period of time vary.

In yet another example, a device can include a non-transitory computer-readable storage medium and a plurality of programming instructions stored in the storage medium to cause the device, in response to execution of the programming instructions by a processing resource, to perform a plurality of operations. The operations cause the device to monitor a measurement from a proximity sensor, determine whether the device is proximate to an object based upon the measurement. Upon determining the device is proximate to the object, the operations can cause the device to collect measurements from the proximity sensor over a period of time and adjust the transmitted power output of an antenna if the measurements collected over the period of time vary.

With reference to the figures, FIG. 1 is a block diagram illustrating a portable computing device 100 including a network interface 114 adapted to connect the device 100 to a radio communication system 116, as an example. The radio communication system 116 may be a structure disposed remote from the portable computing device 100, and they may exchange communications with each other via wireless signals 118. In some embodiments, the radio communication system 116 may be a wireless router, a peripheral computing device adapted to provide a wireless signal, a cell phone station, and the like. The network interface 114 may include an antenna module 102, to allow for transmission and receipt of wireless signals, and a proximity sensor 104 coupled to the antenna module 102. The antenna module 102 may be a structure of a low profile antenna such as a patch antenna. The antenna module 102 may be constructed on a dielectric substrate, and communicatively coupled to the portable computing device 100.

The proximity sensor 104 may be associated near the antenna module 102 or integrated with circuitry of the antenna module 102, in order to determine proximity of an object near the antenna module 102 of the portable 100, which may be a source of RE radiation for the portable device 100. The portable computing device 100 also includes a processor 106 and a storage device 110. The components of the portable computing device 100 may be connected and communicate through a system bus (e.g., PCI, ISA, PCI-Express, HyperTransport®, NuBus, etc.).

The proximity sensor 104 may detect the proximity of the antenna module 102 of the portable computing device 100 to an animate object, such as to a human body, or an inanimate object, such as to a book or table. The portable computing device 100 is determined to be in the proximity of an object if the proximity sensor 104 determines that a part of the object is within some predefined distance of the antenna module 102 of the device 100. As an example, the proximity sensor 104 may be a capacitive sensor, which capacitively provides an indication of proximity when the portable computing device 100 is within the predefined distance of the part of the object. The proximity sensor 104 may detect changes in capacitance that may be associated with the proximity of the object. In other examples, other types of proximity sensors may be used for detecting the proximity of the portable device 100 to an object, such as infrared and/or magnetic sensors, but use of the capacitive sensor will be further described.

As an example, the proximity sensor 104 may be one conductive element of a capacitor. The other conductive element of the capacitor may be the object exterior to the portable device 100, such as the hands of a user or earth ground. The proximity sensor 104 may utilize capacitive charge and discharge cycles to detect changes in capacitance that may be associated with the proximity of the other conductive element. Since the area of the proximity sensor 104 and the other conductive element may remain constant, and the dielectric of the material between the conductive elements (e.g., air) may also remain constant, a change in capacitance may be a result of a change in the distance between the proximity sensor 104 and the other conductive element. Since capacitance is inversely proportional to the distance between the conductive elements, capacitance may increase as the distance between the proximity sensor 104 and other conductive element decreases.

By charging the proximity sensor 104 to a fixed potential, then transferring that charge to a charge detector comprising another known capacitor (e.g., a reference capacitor), the capacitance of the capacitor including the proximity sensor 104 may be readily ascertainable. As a result, the proximity sensor 104 may provide a capacitance based on the environment external to the portable device 100. Detecting a capacitance that exceeds a SAR limit set for the portable device 100 may indicate proximity of the antenna module 102 of the device 100 to an object. As an example, reaching a threshold value of charge and discharge cycles may be indicative of the antenna module 102 of the portable device 100 being a certain distance (e.g., 1 cm) from the object.

Upon detecting proximity of the portable device 100 to an object, the portable device 100 may collect, via the proximity sensor 104, capacitance measurements over a period of time in order to determine whether the object is an animate or inanimate object. Capacitance measurements collected over the period of time that vary may be an indication of movement of the portable device 100, for example, within the hands of a user. As a result, the object that is proximate to the portable device 100 may be an animate object, such as a user's hand, the user's face, or another body part of the user, and the transmitted power output of the antenna module 102 may be reduced. Other strategies to offset a reduction in separation distance with an animate object include, but are not limited to, switching to another antenna of the portable device 100, changing the data rate/modulation, and injecting idle times in the upload stream.

However, capacitance measurements collected over the period of time that remain constant or substantially constant, may be an indication of no movement of the portable device 100, for example, resting on the surface of a table. As a result, the object that is proximate to the portable device 100 may be an inanimate object (e.g., the table), and the transmitted power output of the antenna module 102 may be increased or remain the same, since there may be no concern of RF radiation exposure. By collecting capacitance measurements over a period of time upon detecting proximity of the portable device 100 to an object, the proximity sensor 104 may enable the antenna module 102 to adjust transmission of signals, such as radio signals, to a tower, base station, wireless router, and the like, based on whether the object proximate to the portable device 100 is an animate or inanimate object.

As an example, rather than sing the proximity sensor 104 for collecting measurements over a period of time, the portable device 100 may include an accelerometer (not shown) or another type of sensor that can detect movement of the portable device 100. Therefore, upon detecting proximity of the portable device 100 to an object via the proximity sensor 104, if movement of the portable device 100 is detected by the accelerometer, the movement may be indicative of the device 100 being held by a user. As a result, the transmitted power output of the antenna module 102 may be reduced.

The portable computing device 100 may be, for example, a laptop computer, desktop computer, tablet computer, mobile device, server, or cellular phone, a wearable computing device, among others. The processor 106 can be a single core processor, a multi-core processor, a computing cluster, or any number of other configurations. The processor 106 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the main processor 106 includes dual-core processor(s), dual-core mobile processor(s), or the like.

The portable computing device 100 may include a memory device 108. The memory device 108 can include random access memory (e.g., SRAM, DRAM, zero capacitor RAM, SONGS, eDRAM, EDO RAM, DDR RAM, RRAM, PRAM, etc.), read only memory (e.g., Mask ROM, PROM, EPROM, EEPROM, etc.), flash memory, or any other suitable memory systems.

The storage device 110 may be a non-transitory computer readable storage medium. The storage device 110 may have instructions stored thereon that, when executed by a processing resource, such as the processor 106, cause the portable computing device 10 to perform operations. In some embodiments, the operations may be executed by a controller (not shown). As an example, the controller may be a microcontroller configured to determine, via the proximity sensor 104, whether a SAR exceeds a threshold for the proximity of the portable computing device 100 relative to an object (e.g., animate or inanimate object).

In various implementations, the threshold may be an upper limit determined by, for example, a government agency. As an example, the capacitance values produced by the proximity sensor 104 while triggering the threshold may be indicative of the portable device 100 being a certain distance (e.g., 1 cm) from the object. In response to determining that the SAR is above a threshold, the controller may collect capacitance measurements from the proximity sensor 104 over a period of time. If the capacitance measurements vary over the period of time (e.g., portable device 100 proximate an animate object), the controller may instruct the network interface 114 to control the transmit power of the antenna module 102 to reduce the overall SAR.

In other embodiments, the operations may be executed by logic at least partially comprising hardware logic. Hardware logic at least partially includes hardware, and may also include software, or firmware. Hardware logic may include electronic hardware including interconnected electronic components to perform analog or logic operations on the portable computing device 100. Electronic hardware may include individual chips/circuits and distributed information processing systems. The operations may include reducing the communication of the antenna module 102 when a user is detected to be nearby. For example, the antenna module 102 may be electrically coupled to a transmitter configured to communicate radio frequencies with the radio communication system 116. If a user is nearby, the proximity sensor 104 may reflect capacitance measurements that vary over a period of time. In response, the portable computing device 100 may reduce the signal strength of the transmitter.

Figure 2A:
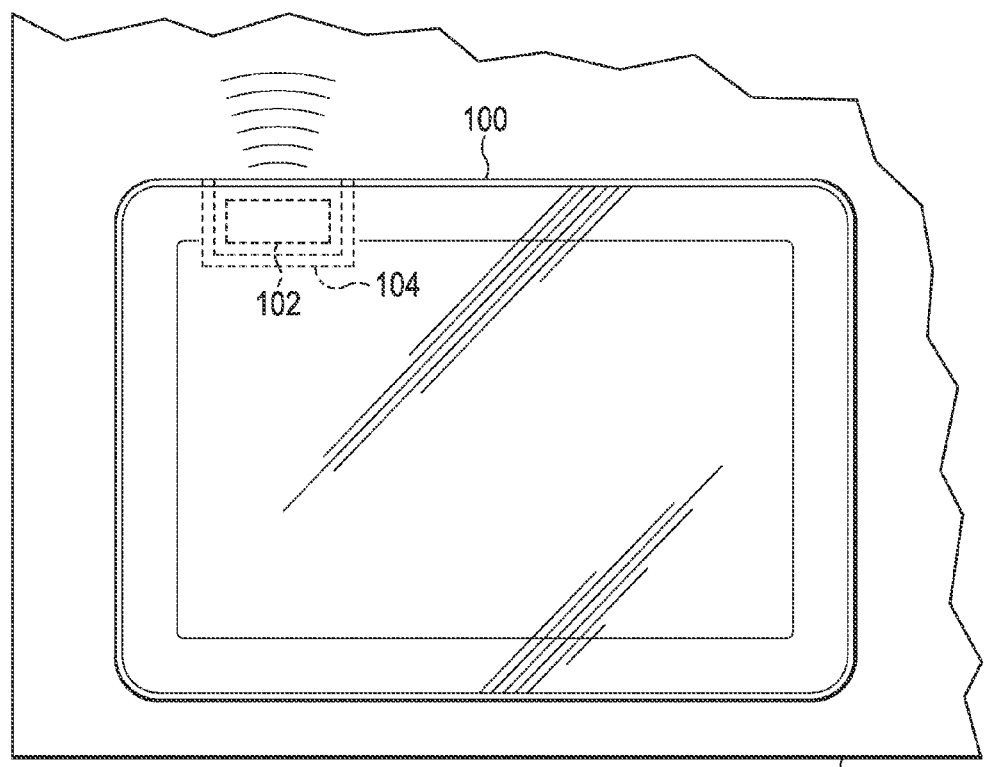
FIG. 2A illustrates the portable computing device resting on a surface, according to an example.

FIG. 2A illustrates the portable computing device 100 resting on a surface 210, such as a table or desk, as an example. The portable computing device 100 may include one or more antenna modules 102 for wirelessly communicating with different radio communication systems 116, such as a Wi-Fi router and/or a cell phone station. A proximity sensor 104 may be associated near the antenna module 102 or integrated with circuitry of the antenna module 102, in order to determine proximity of an object near the antenna module 102 of the portable device 100.

Although the portable device 100 is shown as lying flat on the surface 210, the device 100 may be placed on the surface 210 at a viewing angle that is appropriate for a user. Placing the portable device 100 on the surface 210 may be useful when the user is using the device 100 for viewing purposes (e.g., web browsing or video conferencing) and/or input purposes (e.g., inputting information via a keyboard). When the portable device 100 is used in this mode, the separation distance between the antenna module 102 of the device 100 and the user may be sufficient to remove any concern for RF radiation levels absorbed by the user via the transmitted power output of the antenna module 102. However, due to the proximity of the device 100 to the surface 210, the transmitted power output of the antenna module 102 may still be unnecessarily reduced, negatively affecting the wireless performance of the device 100. For example, by reducing the output power of the antenna module 102, wireless signals from the antenna module 102 may not reach the cell phone station. Examples disclosed herein provide the ability for the portable device 100 to differentiate between animate objects and inanimate objects (e.g., the surface 210). By differentiating between animate and inanimate objects, the wireless performance of the device may overall improve.

Figure 2B:
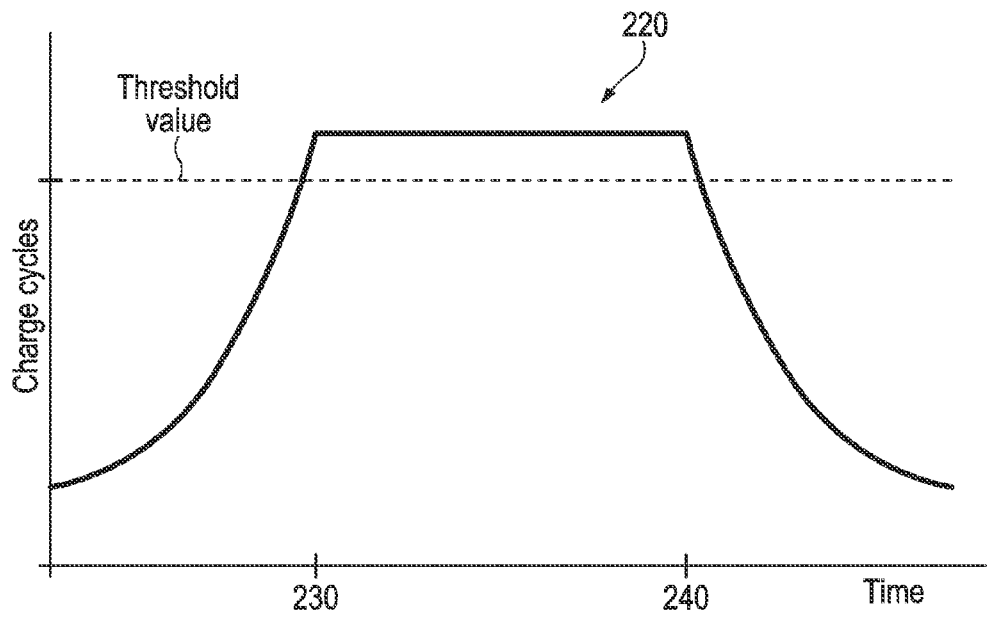
FIG. 2B illustrates an example plot of charge and discharge cycles of a proximity sensor of the portable device illustrated in FIG. 2A.

FIG. 2B illustrates an example plot of charge and discharge cycles of the proximity sensor 104 as the portable device 100 is placed on the surface 210, as illustrated in FIG. 2A. As an example, the portable device 100 may be placed on the surface 210 from time 230 to time 240. As described above, the proximity sensor 104 may utilize capacitive charge and discharge cycles to detect changes in capacitance that may be associated with the proximity of the antenna module 102 of the portable device 100 to an object.

Referring to FIG. 26, reaching a threshold value of charge and discharge cycles may be indicative of the antenna module 102 of the portable device 100 being a certain distance (e.g., 1 cm) from the surface 210. Upon detecting proximity of the portable device 100 to the surface 210 (e.g., exceeding the threshold value of charge and discharge cycles), the portable device 100 may collect, via the proximity sensor 104, capacitance measurements over a period of time (e.g., beginning from time 230). As illustrated at 220, the capacitance measurements collected over the period of time remain constant, which may be indicative of no movement of the portable device 100, for example, resting on the surface 210 (i.e., the portable device 100 is static).

Although the placement of the portable device 100 on the surface 210 may provide an indication of a SAR exceeding a threshold for the proximity of the device 100 relative to the surface 210, the transmitted power output of the antenna module 102 may remain the same or be increased, due to the capacitance measurements remaining constant over the period of time, or substantially constant (e.g., very small). Avoiding an unnecessary decrease in the transmitted power output may result in satisfactory wireless performance of the portable device 100, allowing wireless signals from the antenna module 102 to reach a cell phone station.

Figure 3A:
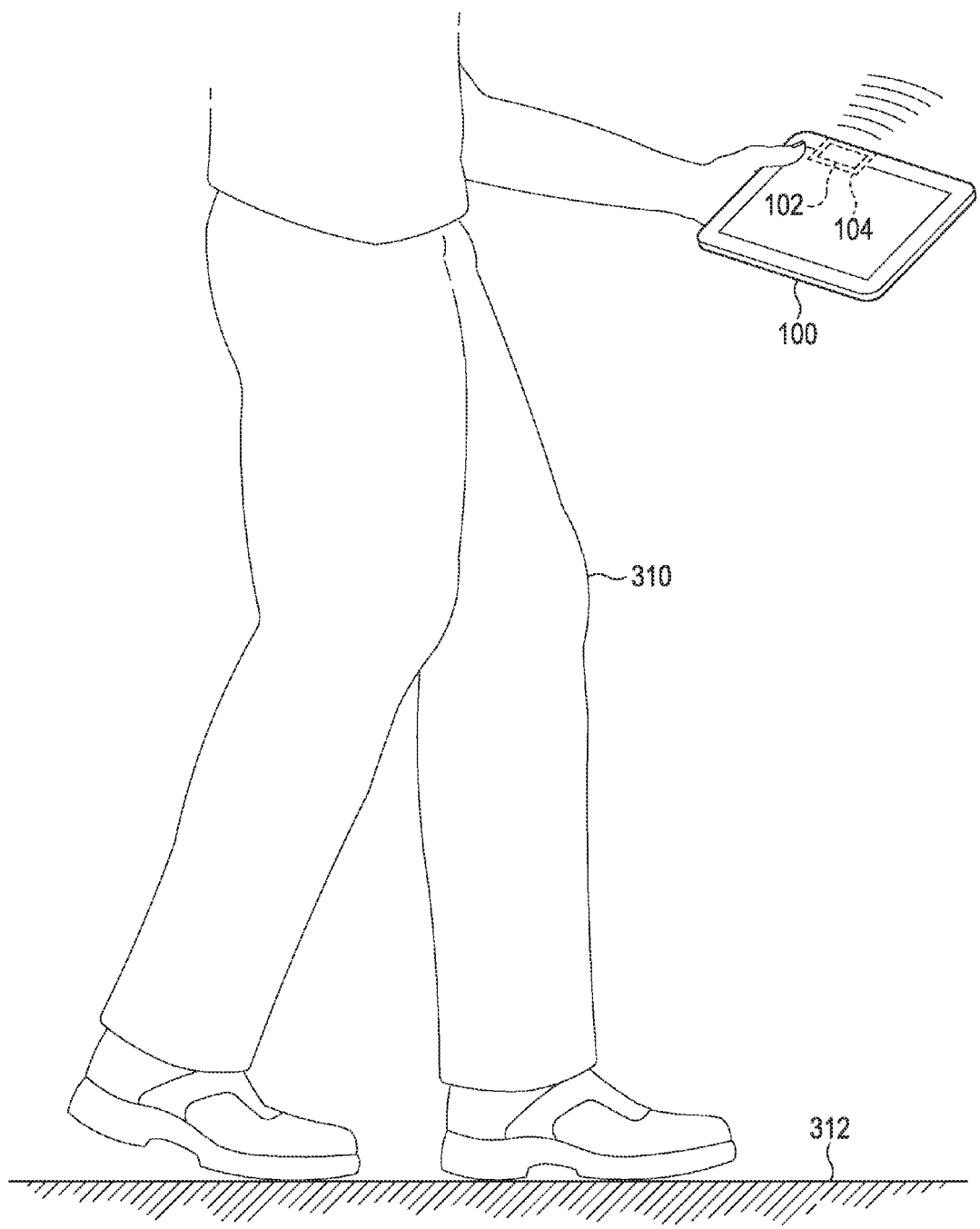
FIG. 3A illustrates the portable computing device held in the hands of a user, according to an example.

FIG. 3A illustrates the portable computing device 100 held in the hands of a user 310, as an example. As described earlier, a proximity sensor 104 may be associated near an antenna module 102 or integrated with circuitry of the antenna module 102, in order to determine proximity of an object near the antenna module 102 of the portable device 100. As the portable device 100 is held in the hands of the user 310, the placement of the device 100 with respect to the user 310 may change. As an example, the user 310 may bring the device 100 closer to the user's face or another body part of the user. In addition, the device 100 may not be held perfectly consistent within the hands of the user 310. As an example, the position of the device 100 with respect to an earth ground reference 312 may also change as the user 310 handles the device (e.g., XYZ movement of the portable device 100 with respect to the earth ground reference 312).

As described above, the proximity sensor 104 may be one conductive element of a capacitor, and the other conductive element of the capacitor may be objects exterior to the portable device 100, such as a body part of the user 310 or the earth ground reference 312. The proximity sensor 104 may utilize capacitive charge and discharge cycles to detect changes in capacitance that may be associated with the proximity of the other conductive element.

Figure 3B:
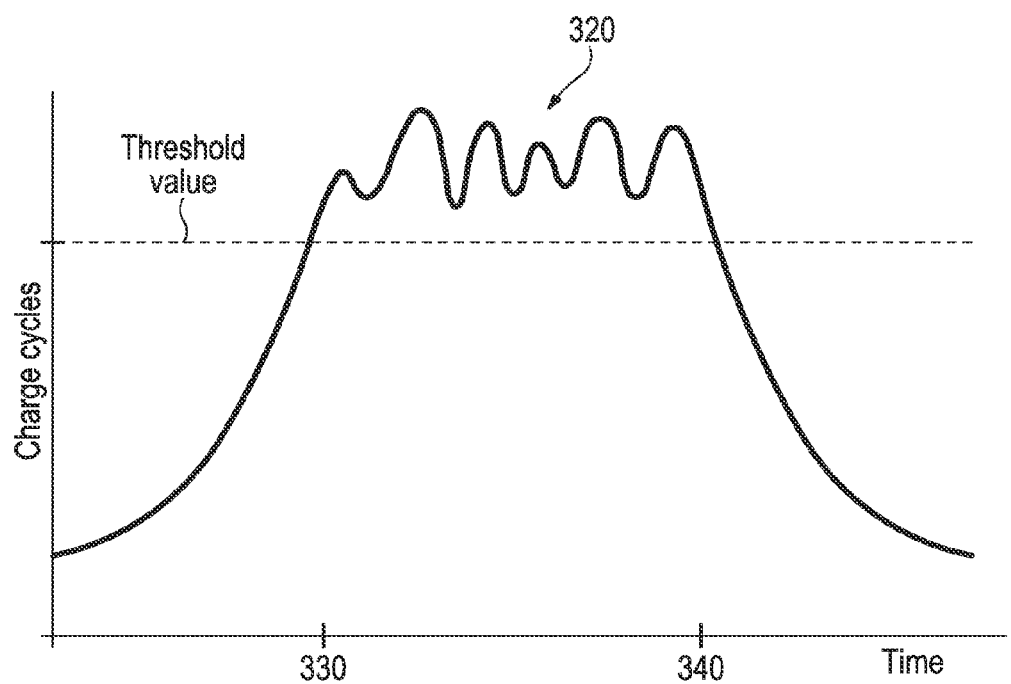
FIG. 3B illustrates an example plot of charge and discharge cycles of the proximity sensor of the portable device illustrated in FIG. 3A.

FIG. 3B illustrates an example plot of charge and discharge cycles of the proximity, sensor 104 as the portable device 100 is held in the hands of the user 310, as illustrated in FIG. 3A. As an example, the portable device 100 may be held in the hands of the user 310 from time 330 to time 340. During this time, the position of the portable device 100 may change with respect to a body part of the user 310 and/or the earth ground reference 312.

Referring to FIG. 3B, reaching a threshold value of charge and discharge cycles (e.g., detecting a capacitance that exceeds a tested SAR limit set for the portable device 100) may be indicative of the antenna module 102 of the portable device 100 being a certain distance (e.g., 1 cm) from an object, such as a body part of the user 310. Upon detecting proximity of the portable device 100 to the object (e.g., exceeding the threshold value of charge and discharge cycles), the portable device 100 may collect, via the proximity sensor 104, capacitance measurements over a period of time (e.g., beginning from time 330) in order to determine whether the object is an animate or inanimate object. As illustrated at 320, the capacitance measurements collected over the period vary, which may be indicative of movement of the portable device 100.

As an example, the variations of the capacitance measurements at 320 may be due to movement of the portable device 100 with respect to a body part of the user 310 and/or the earth ground reference 312. By detecting a capacitance that exceeds the tested SAR limit for the proximity of the portable device 100 relative to a body part of the user 310, and determining that the capacitance measurements vary of the period of time, the transmitted power output of the antenna module 102 may be reduced, in an effort to satisfy SAR compliance criteria. Other strategies to offset a reduction in separation distance with an animate object include, but are not limited to, switching to another antenna of the portable device 100, changing the data rate/modulation, and injecting idle times in the upload stream.

Figure 4:
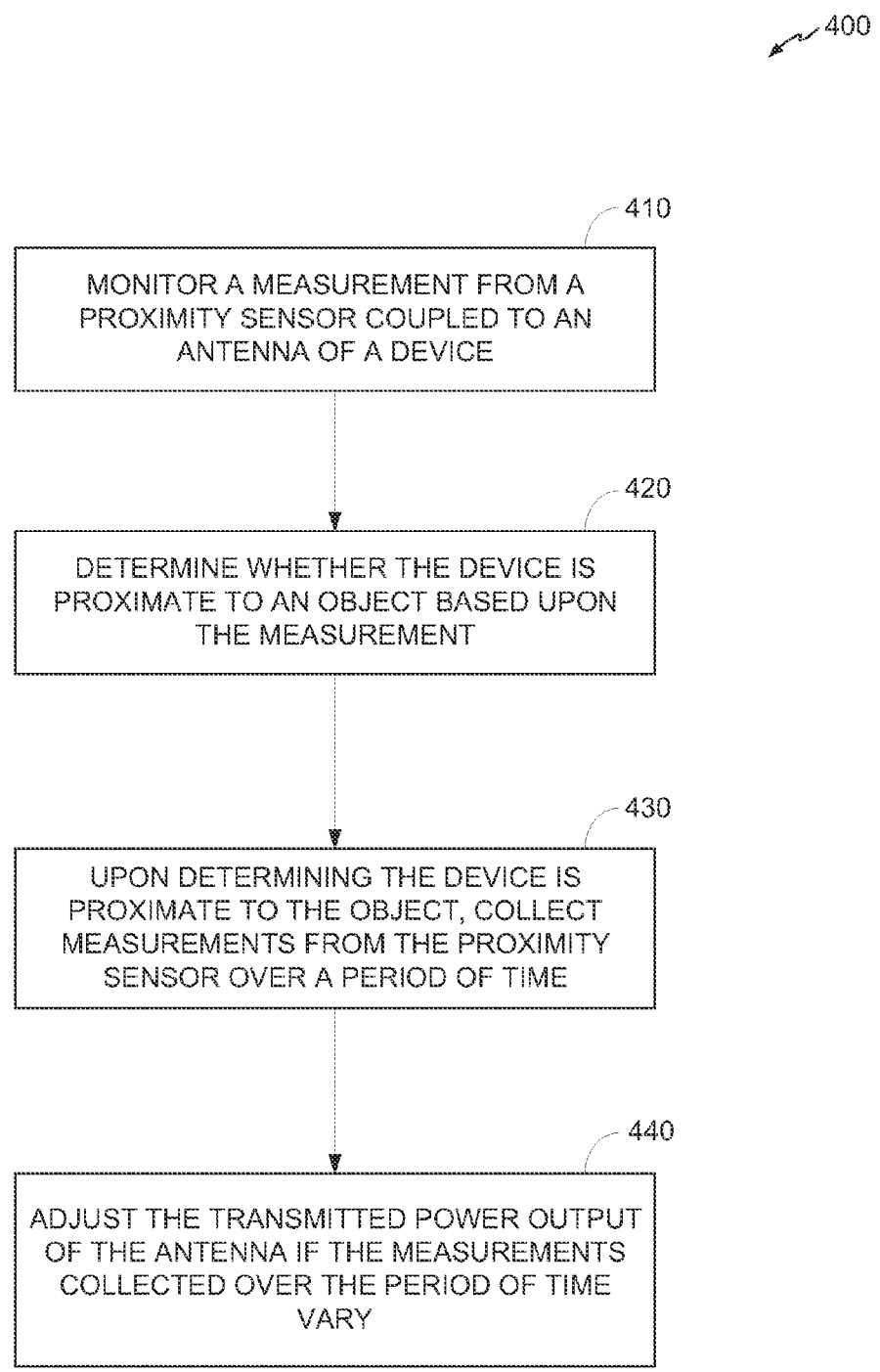
FIG. 4 is a flow diagram accordance with an example of the present disclosure.

Referring to FIG. 4, a flow diagram is illustrated in accordance with various examples. The flow diagram illustrates processes for adjusting a transmitted power output of an antenna of a device (e.g., portable computing device 100) in a particular order. The order of the processes is not meant to limit the disclosure. Rather, it is expressly intended that one or more of the processes may occur in other orders or simultaneously. The disclosure is not to be limited to any particular example.

A method 400 may begin and progress to 410, where the device may monitor a measurement from a proximity sensor coupled to the antenna. As an example, the proximity sensor may be associated near the antenna or integrated with circuitry of the antenna, in order to determine proximity of an object near the antenna of the device, which may be a source of RF radiation for the device.

Progressing to 420, the device may determine whether the device is proximate to an object based upon the measurement. As an example, the device may determine whether the device is proximate to the object by determining whether the measurement from the sensor is above a threshold value, such as a specified SAR.

Progressing to 430, upon determining the device is proximate to the object, the device may collect measurements from the proximity sensor over a period of time. As an example, measurements from the proximity sensor may include measurements based on a movement of the device with respect to an animate or inanimate object, or a ground reference.

Progressing to 440, the device may adjust the transmitted power output of the antenna if the measurements collected over the period of time vary. This may be indicative of movement of the device with respect to the object, such as within the hands of a user. Examples of adjusting the transmitted power output of the antenna include, but are not limited to, reducing the transmitted power output, switching to another antenna of the device, changing the data rate/modulation, and injecting idle times in the upload stream. However, if the measurements collected over the period of time remain substantially constant, the device may maintain or increase the transmitted power output of the antenna. This may be indicative of no movement of the device with respect to the object, such as resting on a table.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method of adjusting a transmitted power output of an antenna of a device, comprising:
   monitoring a measurement from a proximity sensor coupled to the antenna;
   determining whether the device is proximate to an object based upon the measurement, based on whether the measurement from the sensor is above a threshold value;
   upon determining the device is proximate to the object, collecting measurements from the proximity sensor over a period of time; and
   adjusting the transmitted power output of the antenna when the object is determined to be a body part based on the measurements collected over the period of time remaining above the threshold value and varying, while remaining above the threshold value.

2. The method of claim 1, wherein adjusting the transmitted power output of the antenna comprises reducing the transmitted power output.

3. The method of claim 1, comprising maintaining or increasing the transmitted power output of the antenna if the measurements collected over the period of time remain constant.

4. The method of claim 1, wherein measurements from the proximity sensor comprise measuring values based on a movement of the device with respect to a ground reference.

5. The method of claim 1, wherein measurements from the proximity sensor comprise measuring values based on a movement of the device with respect to an animate object.

6. A device, comprising:
   an antenna;
   a proximity sensor coupled to the antenna to determine whether the device is proximate to an object if a measurement from the sensor is above a threshold value; and
   a controller to reduce a transmitted power output of the antenna when the object is determined to be a body part based on measurements from the sensor collected over a period of time remaining above the threshold value and varying, while remaining above the threshold value.

7. The device of claim 6, wherein the controller is to maintain or increase the transmitted power output of the antenna if the object is proximate to the device and measurements collected over the period of time remain constant.

8. The device of claim 6, wherein the proximity sensor measures values based on a movement of the device with respect to a ground reference.

9. The device of claim 6, wherein the proximity sensor measures values based on a movement of the device with respect to an inanimate object.

10. A device, comprising a non-transitory computer-readable storage medium and a plurality of programming instructions stored in the storage medium to cause the device, in response to execution of the programming instructions by a processing resource, to cause the device to:
- monitor a measurement from a proximity sensor;
- determine whether the device is proximate to an object based upon the measurement, based on whether the measurement from the sensor is above a threshold value;
- upon determining the device is proximate to the object, collect measurements from the proximity sensor over a period of time; and
- adjust the transmitted power output of an antenna when the object is determined to be a body part based on the measurements collected over the period of time remaining above the threshold value and varying, while remaining above the threshold value.

11. The device of claim 10, wherein the instruction for adjusting the transmitted power output of the antenna comprises reducing the transmitted power output.

12. The device of claim 10, comprising instructions for maintaining or increasing the transmitted power output of the antenna if the measurements collected over the period of time remain constant.

13. The device of claim 10, wherein the proximity sensor measures values based on a movement of the device with respect to a ground reference.

14. The method of claim 1, wherein the measurements collected over the period of time vary if the measurements change in a cyclical manner.

15. The method of claim 1, wherein the measurements collected over the period of time vary if the measurements change in a random manner.

* * * * *

UNITED STATES PATENT AND TRADEMARK OFFICE
CERTIFICATE OF CORRECTION

PATENT NO. : 9,986,516 B2
APPLICATION NO. : 14/893949
DATED : May 29, 2018
INVENTOR(S) : Isaac Lagnado Page 1 of 1

It is certified that error appears in the above-identified patent and that said Letters Patent is hereby corrected as shown below:

On the Title Page

Column 2, item (56), under US patent documents, Line 9, delete "Shi" and insert -- Shi et al. --, therefor.

Signed and Sealed this
Second Day of October, 2018

Andrei Iancu
*Director of the United States Patent and Trademark Office*